Dec. 10, 1929.  F. W. GAY  1,739,136
ALTERNATING CURRENT GENERATOR AND ELECTRIC SYSTEM INCLUDING THE SAME
Filed Dec. 17, 1927
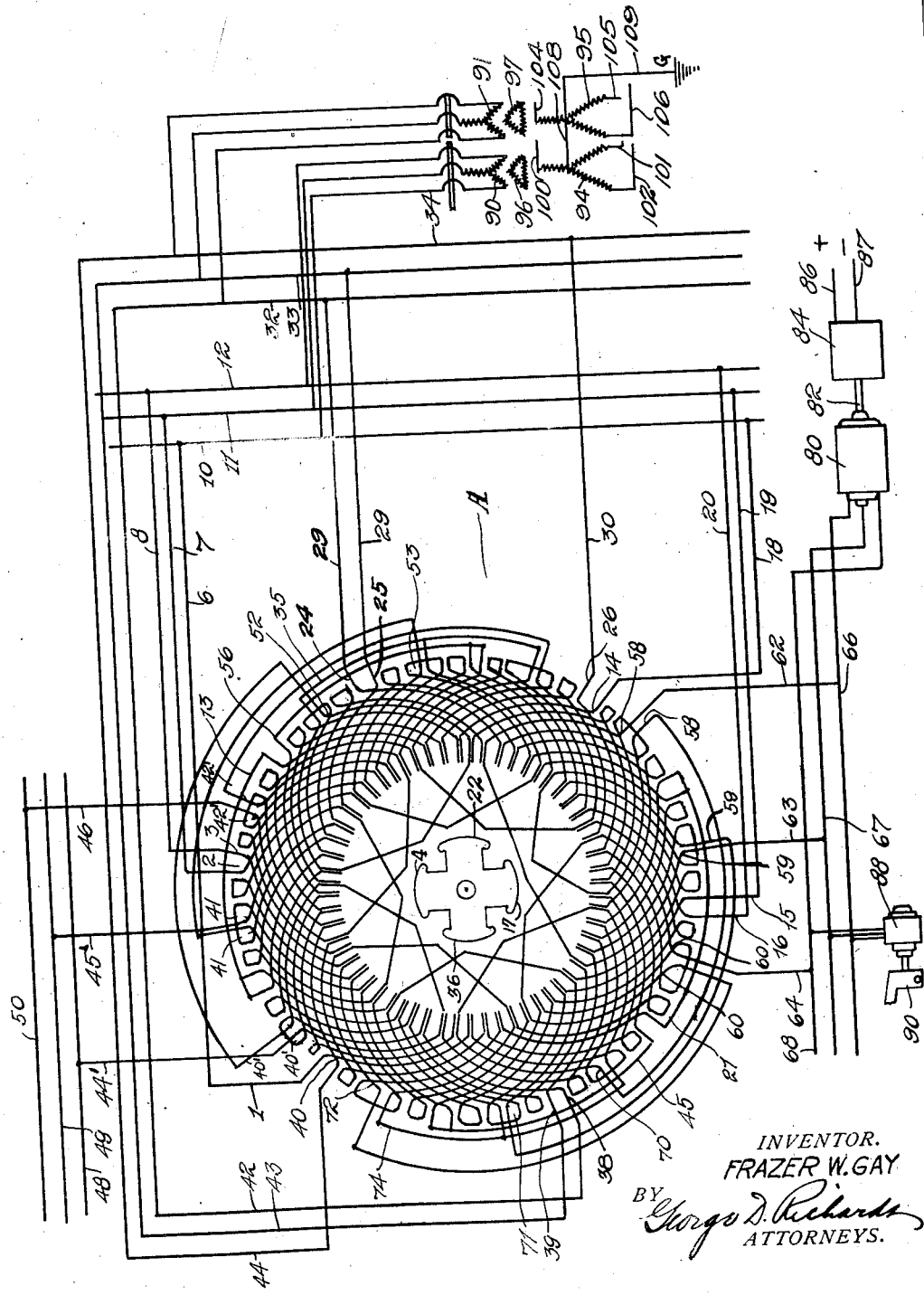
INVENTOR.
FRAZER W. GAY
BY
George D. Richards
ATTORNEYS.

Patented Dec. 10, 1929

1,739,136

UNITED STATES PATENT OFFICE

FRAZER W. GAY, OF NEWARK, NEW JERSEY

ALTERNATING-CURRENT GENERATOR AND ELECTRIC SYSTEM INCLUDING THE SAME

Application filed December 17, 1927. Serial No. 240,713.

The present invention relates, generally, to electrical generators, and more particularly to generators which include auxiliary windings which are separate from the main windings and are utilized for the generation of power for the operation of apparatus which is auxiliary to propulsion means for the generator. The invention further relates to generators having a main winding and an auxiliary winding, each of which windings is made up in separately insulated parts for the purposes and advantages herein described and for use in the arts generally. And the invention also relates to electrical circuits including the apparatus of the invention and other apparatus.

Heretofore motors used to drive apparatus auxiliary to a power generator and its associated boiler etc. have usually been supplied with power in one of the following ways:

By separate turbo generators used wholly or in part for general power house service;

Directly off the main power leads of the generator or off the main power bus; generally through transformers; or By an auxiliary power generator coupled directly to the main generator shaft.

Some of the disadvantages of such methods of power supply are as follows:

1. Separate turbo generator

The size of the separate units is generally based on the ultimate capacity of the station and the number installed is determined by the required reliability of service which is generally very nearly as exacting when the first units are installed as when the station is, if ever, completed. In consequence of the above the initial capital investment in this method of power supply is disproportionately great and the initial efficiency of equipment is too low. There is therefore a temptation to supply some of the excess power available from the auxiliary power installation to customers or generally through transformers to the main station bus and when this is done the reliability of the station suffers. Even when the initial installation is the final installation the size of the units is small with respect to the size of the main units and their efficiency is correspondingly lower. The low load factor on these units and the necessary compromises in design to permit rapid starting further cuts down this already too low efficiency.

2. Off station bus

When power is taken directly from the main generator or from the station bus the reliability of such power and the possibility of a long shut down in case of a general station short circuit requiring a momentary killing of the bus is so great that in addition to a complete motor operated set of auxiliaries there is generally supplied a complete set of steam driven auxiliaries.

3. Direct connected auxiliary power generator

The auxiliary power generator coupled directly to the main generator shaft has the advantage that it is driven by a large and efficient turbine. However it is generally customary to supply an additional auxiliary power source and there is the further danger that the main generator may have to be shut down due to mechanical or electrical troubles in the auxiliary generator coupled to it.

An object of this invention, then, is to overcome the above mentioned difficulties by providing a novel method of connecting the windings of an alternating current generator so as to accomplish the following results:

1st. To provide in the generator, in addition to the main power windings, one or more auxiliary power circuits adapted to operate the motors used to drive the apparatus auxiliary to the power generator;

2nd. To so locate and connect the auxiliary power circuits that one or more of the following advantages are obtained;

a. Said auxiliary power circuits generate E. M. F. of the same time phase as the mean time phase of the main power windings in the generator;

b. Any one of said auxiliary power circuits may be short circuited without materially lowering the voltage in any other of said auxiliary power circuits;

c. Every part of any auxiliary power circuit is separated from every other part of the same circuit by parts of another separately insulated circuit.

Other objects and advantages of the invention will be apparent from this specification and from the drawings forming part thereof, and also from the statements of the invention set forth in the appended claims.

And the invention also consists in the new and useful combinations and arrangements of parts in the generator and electric circuits, all as described and shown herein, and set forth in the claims.

The invention is illustrated in the accompanying drawing, in which is shown a diagram of apparatus and circuits involving the invention.

Now in the modern central station the size of the individual unit is so great that each unit is coming to be considered practically as a separate power station. Each generator unit having its own turbines, boilers, auxiliary power supply etc., largely separate from every other such unit.

Now the power required to operate the auxiliaries of a modern turbo generator at maximum load with all boilers, etc., at the top of their rating is from 7 to 9%. Such machines may generally be most satisfactorily wound with about 9 or 11 coils per pole per phase. I propose to use one coil per pole per phase for auxiliary power so that there will generally be available for auxiliary power an amount equal approximately to 10% of the salable power output of the machine. The coil chosen for auxiliary power will preferably be the centre coil in its phase group so that the time phase of its generated E. M. F. will be the same as the average time phase of all coils in the phase group. By reason of this time phase characteristic it will be possible to use power directly from the station bus or from the station bus after passing through suitably connected transformers. An auxiliary power circuit may thus be switched either directly on to a machine auxiliary power circuit or on to the station power circuit while under load.

In the preferred form of the invention, a main winding and an auxiliary winding are so located with respect to each other that short circuits on the main winding will have a minimum effect in reducing voltage on the auxiliary winding. In general, when short circuits occur close to the power station, the voltage of the auxiliary winding will be substantially twice that of the main winding. The voltage of the main winding is that resulting from the impedance drop between the generator and the short circuit. In the preferred form of the invention to be described, this drop is substantially equivalent to that across the transformer in the short circuited main line. The voltage of the auxiliary winding on the other hand is that produced by the total flux of the revolving rotor. This flux is in general, sufficient to produce a voltage in the main winding that will overcome the impedance within the generator as well as that in the short circuited line. In a modern turbogenerator, the impedance incorporated within the machine is just sufficient to prevent its destruction when short circuited at its terminals. It is intended not only to protect the machine, but also to provide additional current limiting means by incorporating in the associated transformer or other reactive means an external impedance substantially equivalent to that of the machine itself. The use of synchronous machinery on the auxiliary winding will still further tend to maintain voltage on said auxiliary winding during periods of short circuits on said main winding. It will be evident to one skilled in the art that in case of a short circuit in the main winding there will be a reduction in voltage in the auxiliary winding owing to such causes as leakage flux, back E. M. F. of the main winding, etc. The synchronous machine will be overexcited with respect to a low voltage at its terminals and will therefore furnish to the auxiliary winding a heavy leading power factor current. This current will produce a rise in voltage in the auxiliary winding proportional to the reactance of said winding and will also tend to slightly increase the strength of the generator magnetic flux. In case a main winding is used with a single auxiliary winding it will be evident that the voltage on the auxiliary winding will be considerable even though the main winding is short circuited at the machine terminals. If now a short circuit comes on the main winding the short circuit current will be several times normal even after a steady state has been reached. In this case the internal voltage generated in the windings will be in the neighborhood of 50% and the voltage on the auxiliary bus will be higher by reason of the heavy leading power factor current drawn at low voltage from the synchronous motor. The advantages of my invention become most marked if either of the following modern systems of station operation are combined with it.

1. Each generator is solidly connected to its own transformer bank without the bussing of the generator windings in the station.

2. The use of multiple windings in the generator and the bussing of such windings in a manner that largely precludes the possibiilty of a simultaneous short circuit on more than one of said generator windings.

First: If the generator is solidly connected to its transformer then the impedance voltage across the transformer bank, is itself of considerable value during short circuit and this voltage adds to the machine reactance to give an internal generated voltage in the auxiliary windings ample to meet all requirements. The terminal voltage of the auxiliary windings is still further augmented by the heavy leading current from the synchronous motor;

Second: If multiple main generator windings are used and so connected to synchronizing means, the probability of more than one being short circuited at once is remote, then the flux in the machine will not be seriously backed off by such partial short circuit and the voltage on the auxiliary power bus will be maintained at a safe value.

In the preferable form of my invention, I propose to use two auxiliary windings each carrying normally one half the auxiliary power load. The motors driving the auxiliaries may be run off both busses so that in case of trouble with one auxiliary power source, the remaining source and its connected motors will continue to function; and since the power consumed by the auxiliaries varies about as the square of the load, the turbine may carry 70-75% load with only one auxiliary winding working.

Referring now to Figure 1 of the drawing, there is shown in diagram a generator A which is a four pole three phase alternator whose main generating windings comprise the main three phase coils 1, 2 and 3, under pole 4, which are connected at their outer ends by the leads 6, 7 and 8, respectively, to the main power bus conductors 10, 11, and 12, respectively, and are connected together by the neutral conductor 13. The three phase coils 14, 15 and 16, under the opposite pole 17 are connected at their outer ends by the leads 18, 19 and 20 to the said bus conductors 10, 11 and 12, respectively, and are connected together by the neutral conductor 21. Under the pole 22 are arranged the three phase coils 24, 25, and 26 which are connected at their outer ends by the leads 28, 29 and 30 to the main power bus conductors 32, 33 and 34, respectively; and at their inner ends are connected together by the neutral conductor 35. Under the left hand pole 36 are arranged the three phase coils 38, 39 and 40 which are connected at their outer ends, by the leads 42, 43, and 44 to said bus conductors 32, 33 and 34, respectively, and at their inner ends are connected together by the neutral conductor 45.

In the center of each of the main three phase coil groups is provided a group of separately insulated coils which, from pole to pole about the machine, are connected to form two separately insulated three phase windings, auxiliary to the said main windings, as follows: One end of each of coils 40', 41 and 42' under said pole 4, is connected through the leads 44', 45', and 46 to the auxiliary bus conductors 48, 49 and 50, respectively. The opposite ends of said coils 40' 41 and 42' are connected respectively to the end of the coils 52, 53 and 54, situated under said pole 22, the other ends of which latter coils are connected to each other through a neutral conductor 56. Likewise, the center phase auxiliary coils 58, 59 and 60, under said pole 17, are connected by their outer ends through the leads 62, 63 and 64 to the auxiliary bus conductors 66, 67 and 68, respectively; and at their inner ends are connected, respectively, to the center phase auxiliary coils 70, 71 and 72, situated under said pole 36. The outer ends of said coils 70, 71 and 72 are connected to each other by the neutral conductor 74.

Connected across said auxiliary bus 66, 67 68 is shown a three phase synchronous motor 80 illustrated as connected by the driving shaft 82 to the D. C. generator 84, which latter generator has positive and negative leads 86 and 87 which may supply power to motors driving pumps etc., auxiliary to a steam turbine (not shown) used for driving the motor of said generator 1. Connected across said bus lines 66, 67 and 68 is a three phase motor 88 connected to drive the blower 90, which furnishes cooling air for generator 1. Other auxiliary apparatus (not shown) can be connected to said auxiliary bus 66, 67 and 68. A duplicate set of auxiliary apparatus can be connected to said auxiliary bus 48, 49, 50.

Connected across said output busses 10, 11 and 12 and 32, 33 and 34 are the star connected three phase transformer primaries 90 and 91, respectively, and in operative relation to said primaries 90 and 91 are, the star connected secondaries 94 and 95, respectively, and the tertiaries 96 and 97. From the terminals of said secondaries 94 and 95, are connected, respectively, the high potential busses 100, 101 and 102, and 104, 105, and 106, and a conductor 108 connects the neutral or mid point of said secondaries to the ground connection 109.

Now it is evident that a short circuit on leads 100, 101 and 102 is a short circuit on the windings under the top and bottom poles of the rotor as shown, which windings constitute alternate polar groups of the main power windings. Such a short circuit will considerably reduce the voltage on coils 40', 41 and 42', and coils 58, 59, 60, but will not seriously reduce the voltage on coils 52, 53, 54, and 70, 71, 72. It is also evident that a short circuit on on leads 104, 105 and 106 is a short circuit on the windings under the right and left hand poles 22 and 36 of the rotor, which windings also constitute alternate polar groups of the main power windings. Such a short circuit will considerably reduce the voltage of coils 52, 53, 54 and 70, 71, 72, but will not seriously reduce the voltage on coils 40', 41, 42' and 58, 59, 60. It is therefore seen that for a short circuit on either leads 100, 101 and 102 or leads 104, 105 and 106; the voltages on busses 48, 49, 50 and 66, 67, 68 will not be seriously reduced although in each phase of each auxiliary power winding one of the two coils connected in series to form said phase will have a voltage severely reduced by such short circuit while the other of said two coils will have a voltage not so seriously reduced.

In the event that a single main winding and a single auxiliary winding is used, it will be obvious that a simple transformer bank would be employed and all of the auxiliary equipment would be run off of the single auxiliary winding.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

I claim:

1. In a generating system, a turbo generator, said generator having two polyphase power windings, the coils of alternate polar groups being connected together to form one power winding and the coils of the remaining polar groups being connected together to form the other power winding.

2. In a generating system, duplicate independent electrical circuits, a turbo generator, said generator having two polyphase power windings, the coils of alternate polar groups being connected together to form one power winding and the coils of the remaining polar groups being connected together to form the other power winding and each of said power windings being connected independently to one of said electrical circuits.

3. In a generating system, a multipole alternating current generator having a high capacity winding and a low capacity winding, said windings generating electrical energy having electromotive forces of the same time phase, a main power circuit connected to said high capacity winding and a generator auxiliary power circuit connected to said low capacity winding.

4. In a generating system, a multipole, multiphase turbo generator having uniformly distributed alternating current windings, said windings having an odd number of coils per pole per phase, said coils being interconnected so that the middle coils of the several phase groups comprise a three phase winding and the remaining coils of the phase groups comprise an independent polyphase power winding.

5. In a generating system, a multipole, multiphase turbo-generator having uniformly distributed alternating current windings, said windings having a multiplicity of coils per pole per phase, a coil in one of said phases being connected to corresponding coils in the other phases to provide a three phase winding, auxiliary machinery for effecting the operation of said generator, and motors for operating said auxiliary machinery, said motors being supplied with operating energy from said three phase winding.

In testimony, that I claim the invention set forth above I have hereunto set my hand this 25th day of November, 1927.

FRAZER W. GAY.